United States Patent [19]
Carpio et al.

[11] Patent Number: 5,866,031
[45] Date of Patent: Feb. 2, 1999

[54] SLURRY FORMULATION FOR CHEMICAL MECHANICAL POLISHING OF METALS

[75] Inventors: Ronald A. Carpio, Austin, Tex.; Rahul Jairath, San Jose; Jayashree Kalpathy-Cramer, Milpitas, both of Calif.

[73] Assignee: Sematech, Inc., Austin, Tex.

[21] Appl. No.: 667,994

[22] Filed: Jun. 19, 1996

[51] Int. Cl.$^6$ ................................................. C09K 13/00
[52] U.S. Cl. .................. 252/79.1; 252/186.1; 252/187.1; 252/187.2; 252/187.31; 252/186.43; 252/79.2; 438/692; 216/89; 216/100; 216/102
[58] Field of Search .............................. 252/79.1, 79.2, 252/186.1, 187.1, 187.2, 187.31, 186.43; 438/692, 693, 691, 695; 216/89, 88, 100, 102; 51/307; 106/3

[56] References Cited

U.S. PATENT DOCUMENTS

| | | | |
|---|---|---|---|
| 2,171,546 | 9/1939 | Kappes | 148/8 |
| 2,434,021 | 1/1948 | Thompson et al. | 41/42 |
| 2,939,772 | 6/1960 | Newman et al. | 41/42 |
| 3,351,555 | 11/1967 | Byers et al. | 252/79.2 |
| 3,442,810 | 5/1969 | Elbreder | 252/79.4 |
| 3,464,908 | 9/1969 | Donaldson | 204/195 |
| 3,498,823 | 3/1970 | Jones et al. | 117/71 |
| 3,964,956 | 6/1976 | Snyder | 156/345 |
| 4,022,625 | 5/1977 | Shelton | 106/3 |
| 4,070,193 | 1/1978 | Tucker | 106/14 |
| 4,138,228 | 2/1979 | Hartfelt et al. | 51/295 |
| 4,154,660 | 5/1979 | Micko | 204/1 T |
| 4,512,859 | 4/1985 | Inoue | 204/129.46 |
| 4,600,469 | 7/1986 | Fusco et al. | 156/636 |
| 4,728,552 | 3/1988 | Jensen, Jr. | 428/91 |
| 4,793,895 | 12/1988 | Kaanta et al. | 156/627 |
| 4,944,836 | 7/1990 | Beyer et al. | 156/645 |
| 4,956,313 | 9/1990 | Cote et al. | 437/203 |
| 4,959,113 | 9/1990 | Roberts | 156/636 |
| 4,988,369 | 1/1991 | Akay | 51/293 |
| 5,166,093 | 11/1992 | Grief | 437/173 |
| 5,203,883 | 4/1993 | Perry | 51/293 |
| 5,209,816 | 5/1993 | Yu et al. | 156/636 |
| 5,225,034 | 7/1993 | Yu et al. | 156/636 |
| 5,234,470 | 8/1993 | Lynn et al. | 51/293 |
| 5,340,370 | 8/1994 | Cadien et al. | 51/308 |
| 5,364,510 | 11/1994 | Carpio | 204/153.1 |
| 5,373,047 | 12/1994 | Schnelle | 524/439 |
| 5,407,526 | 4/1995 | Danielson et al. | 156/636 |
| 5,449,313 | 9/1995 | Kordonsky et al. | 451/35 |
| 5,472,370 | 12/1995 | Malshe et al. | 451/41 |
| 5,527,423 | 6/1996 | Neville et al. | 156/636.1 |
| 5,533,923 | 7/1996 | Shamouilian | 451/41 |
| 5,578,362 | 11/1996 | Reinhardt et al. | 428/147 |

FOREIGN PATENT DOCUMENTS

49-045451B  12/1974  Japan .

OTHER PUBLICATIONS

Syromyatnikov et al., "Polymeric Electrolytes for Lithium Chemical Power Sources," *Russian Chemical Reviews*, 64(3):249–257, 1995.
Croce et al., "Synthesis and Characterization of Highly Conducting Gel Electrolytes", *Electrochimica Acta*, 39(14):2187–2194, 1994.
U.S. application No. 08/572,082 (SEMA:052).
U.S. application No. 08/572,632 (SEMA:053).
U.S. application No. 08/697,409 (SEMA:069).
U.S. application No. 08/908,081 (SEMA:078).
Brusic et al., "Corrosion and Protection of Thin–Line Conductors in VLSI Structures," *IBM J. Res. Develop*, 37(2):173–188, Mar. 1993.
Carpio et al., "Initial Study on Copper CMP Slurry Chemistries," *Thin Solid Films*, 266:238–244, 1995.
Farkas et al., "Oxidation and Etching of Tungsten in CMP Slurries," *Advanced Metallization for ULSI Applications in 1994*, Proceedings of the Conference held Oct. 4–6, 1994, in Austin, Texas, pp. 25–32.
Fury et al., "Chemical–Mechanical Planarization of Aluminum–Based Alloys for Multilevel Metallization," *MRS Bulletin*, pp. 61–64, Nov. 1995.
O'Mara, "Planarization by Chemical–Mechanical Polishing for Multilevel metal Integrated Circuits," Omara & Associates, Palo Alto, California.
Stern and Geary, "Electrochemical Polarization," *Journal of the Electrochemical Society*, 104(1):56–63, Jan. 1957.
van Zant, "Ammonium Persulfate as a Stripping and Cleaning Oxidant," *Semiconductor International*, pp. 109–111, Apr. 1984.
Wang et al., "Chemcial–Mechanical Polishing of Dual Damascence Aluminum Interconnect Structures," *Semiconductor International*, pp. 117–122, Oct. 1995.
Willard et al., "Modern Voltammetric Techniques, Voltammtery, Polarography, and Related Techniques," *Instrumental Methods of Analysis Fifth Edition*, D. Van Nostrad Company Publishers, 655–656, 1974.
"Electrochemical Series", CRC Handbook of Chemistry and Physics, 63rd ed., pp. D–162–4, 1983.

*Primary Examiner*—Marion E. McCamish
*Assistant Examiner*—Cheryl Juska
*Attorney, Agent, or Firm*—Arnold, White & Durkee

[57] ABSTRACT

Buffered slurries are used in a semiconductor process for chemical mechanical polishing of metal layers, such as aluminum or titanium. The slurries may comprise an oxidant capable of causing a passive oxide film to form on a metal based layer. The oxidant may comprise a diluent and may be optionally formulated with a separate oxidizing agent, such as ammonium peroxydisulfate. The slurries may include a buffer that maintains a slurry pH where the passive metal oxide film is stable. This pH may be between about 4 and about 9.

25 Claims, 7 Drawing Sheets

SLURRY FORMULATION FOR CHEMICAL MECHANICAL POLISHING OF METALS

BACKGROUND OF THE INVENTION

1. Field of the Invention

This invention relates generally to semiconductor processing and, more specifically to a buffered slurry for use in chemical mechanical polishing of metals, such as titanium or aluminum. In particular, this invention relates to a slurry which has a pH within the passivation range of titanium or aluminum.

2. Description of the Related Art

Metal layers are used for a variety of purposes in the fabrication of integrated circuits. For example, it is well known that metal layers may be used to form interconnective lines, contacts and other conductive features on and above the surface of a semiconductor wafer. Titanium and aluminum are widely used to form such metal layers. During the fabrication process, removal of a metal layer or portion of a metal layer may be required in order to pattern and form various features. Traditionally, this removal has been accomplished predominantly by wet or dry etching techniques well known in the art.

Recently, there has been a great deal of interest in another technique for removing layers known as chemical mechanical polishing (CMP). CMP is a process in which a polishing pad and slurry are used to remove layers from the upper surface of an in-process semiconductor wafer. Mechanical movement of the pad relative to the semiconductor wafer provides an abrasive force for removing the exposed surface layer of the wafer. Because of the broad surface area covered by a pad in most instances, CMP is often used to planarize a given layer across an entire wafer.

A CMP slurry serves multiple roles; namely, it is the medium in which the abrasive particles is dispersed, and secondly it furnishes the chemical agents which promote the chemical process. In order for optimum results in CMP processing, there must be a synergistic relationship between the chemical and mechanical processes. For example, in prior art CMP slurries for polishing a metal layer, a metal etchant, metal oxidizer, and an abrasive agent have been employed. The oxidant reacts with the metal to form a passive oxide layer, which serves to protect the metal from the etchant. During the polishing process, the abrasive agent removes the passive oxide layer from elevated portions of the metal layer, allowing the metal etchant to etch away a portion of the metal layer. Such etching may not be desirable, though, as dishing of the metal layer may result. Once the metal has been etched, the passive oxide layer forms again. Depressed portions of the metal layer surface are not subject to mechanical abrasion, and therefore are not etched away. This process continues until the elevated portions of the metal layer have been etched away, resulting in planarization. To achieve proper planarization, it is desirable that the slurry not etch or corrode the metal in the absence of the abrasive action provided during the CMP process.

CMP processes for polishing aluminum and aluminum based metals have used acidic slurries having pH ranges of less than about 4 or have used highly basic slurries having pH values of approximately 10 or above. For example, CMP slurries available from "CABOT" and "SOLUTION TECHNOLOGY" are employed for polishing with a pH value of about 2.2, and a CMP slurry available from "RODEL" is employed for polishing with a pH value of about 3.76. A CMP slurry available from "FUJIMI" is employed for polishing with a basic pH value of about 10. Although these very acidic and basic prior art CMP slurries may achieve up to two times the removal rate of a more neutral prior art slurry, overall results are less than optimal. In particular, the very acidic slurry solutions result in the occurrence of a dissolution type of chemistry during the CMP process. The disadvantage of dissolution chemistry is that it causes "dishing" to occur. "Dishing" is a term used to describe the creation of a depressed area in a portion of a metal layer surface during the polishing process. Dishing interferes with the creation of a smooth planarized surface. In addition, the acidic slurry solutions of the prior art tend to corrode polishing tool components, such as the conditioning end-effector and any non-plastic parts of the slurry removal system. Furthermore, some prior art CMP slurry solutions for polishing aluminum suffer from stability problems.

Thus, there is need for a suitable CMP slurry for the planarization of aluminum and other metals that achieves high removal rates in the absence of dissolution chemistry and dishing, and without damage to polishing tool components.

SUMMARY OF THE INVENTION

The present invention in one respect is a slurry for use in chemical mechanical polishing of a metal based layer having a negative standard reduction potential with respect to a normal hydrogen electrode on a semiconductor substrate. The slurry comprises a buffer capable of maintaining the pH of the slurry between about 4 and about 9; and an oxidant capable of causing a passive oxide film to form on the metal. The oxidant comprises at least one of a diluent in the slurry, a separate oxidizing agent in the slurry, or a mixture thereof.

The present invention in another respect is a slurry for use in chemical mechanical polishing of an aluminum or titanium metal based layer on a semiconductor substrate. The slurry comprises an ammonium peroxydisulfate oxidant and a buffer, and has a pH of between about 4 and about 9.

The present invention in another respect is a method of chemical mechanical polishing of an aluminum or titanium metal based layer or layer stack on a semiconductor substrate. The method comprises the steps of providing a semiconductor substrate having at least one aluminum or titanium metal based layer to be polished and chemical mechanical polishing the metal based layer using a slurry comprising a buffer and an oxidant. The oxidant used is capable of causing a passive oxide film to form on the negative standard reduction potential metal, and the buffer maintains the pH of the slurry between about 4 and about 9.

DESCRIPTION OF ILLUSTRATIVE EMBODIMENTS

As used herein, the term "substrate" refers to any semiconductor substrate, such as, for example, a semiconductor wafer substrate. It will be understood by those skilled in the art that the term "substrate" may include either a semiconductor wafer or the wafer along with various process layers formed on the wafer. The term "metals" includes metals, refractory metals, intermetallics, combinations thereof, and the like. The terms "titanium" and "aluminum" refer to pure titanium and pure aluminum, as well as titanium based and aluminum based metals, respectively. Titanium based and aluminum based metals include alloys having substantial amounts of titanium and aluminum, respectively (such as alloys containing copper, silicon or other materials). In the practice of the present invention, titanium based and aluminum based metals may also include a mixed metal layer comprised of titanium and aluminum, or a multi-layer stack comprised of separate titanium and aluminum based layers.

When used to describe a passive oxide layer or film, the term "stable" means the oxide layer or film forms on an aluminum or titanium metal layer in the absence of abrasion and creates an effective protective barrier between the metal layer and the corrosive or etching action of a polishing slurry. Generally, the oxide layer maintains this barrier except during those times when the metal layer is exposed to abrasion during the polishing process. Generally, a slurry is an aqueous solution.

Figure 1:
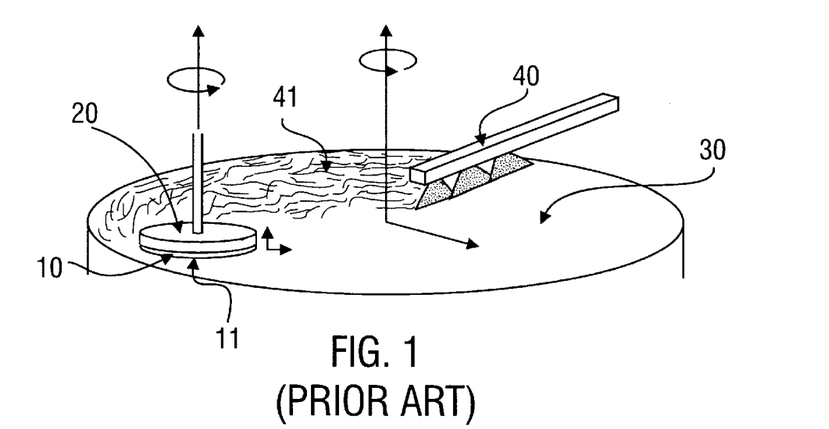
FIG. 1 shows a prior art set up of a tool for performing CMP processing.

FIG. 1 shows a typical set up of a tool for performing CMP processing. A wafer 10 (from which multiple semiconductor devices will be formed) is supported by a wafer carrier 20. The wafer 10 is placed face-down on a polishing pad 30 so that a surface 11, which is to be polished, rests against the surface of pad 30. Wafer carrier 20 is coupled to equipment that provides for the rotation and movement of wafer 10 relative to pad 30. Pad 30 may also be mounted so as to rotate in operation. Slurry delivery system 40 allows slurry 41 to flow over the surface of pad 30 during the polishing operation. It will be appreciated that this general technique for CMP processing is known in the art.

Figure 2A:
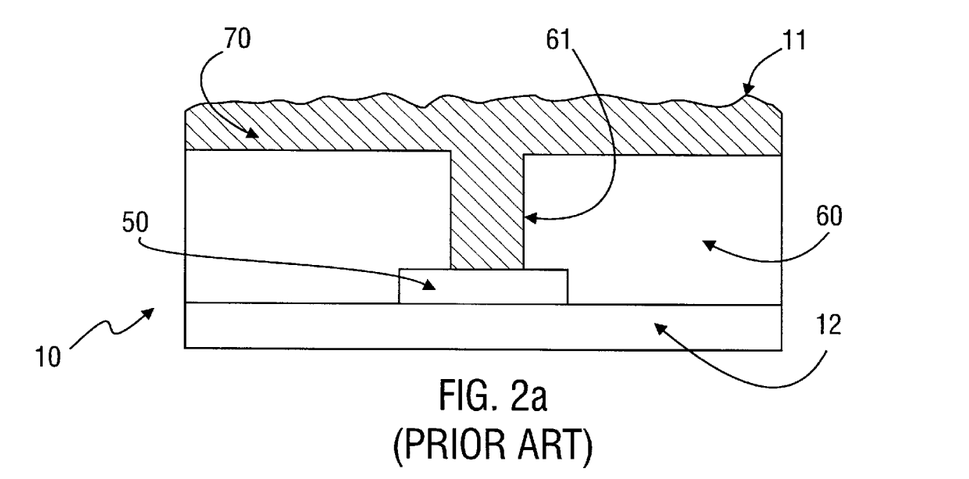
FIG. 2a shows an in-process wafer before CMP processing of a metal layer formed on the upper surface.
Figure 2B:
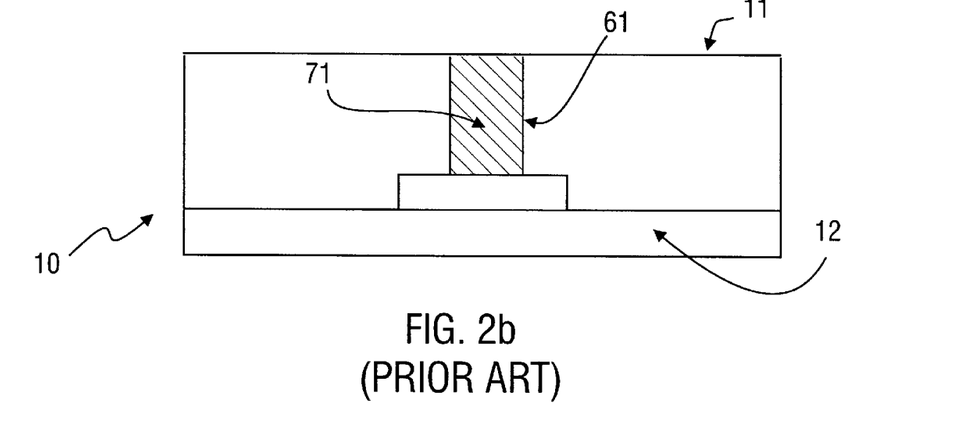
FIG. 2b shows an in-process wafer after CMP processing of a metal layer formed on the upper surface.

FIG. 2a and FIG. 2b show a prior art use of CMP processing to form metal features on a semiconductor wafer. In FIG. 2a, an in-process semiconductor wafer 10 is shown with conductive region 50 disposed on a substrate 12. It will be appreciated that conductive region 50 could alternatively be inset into substrate 12 of the wafer 10, or may rest upon other intermediate layers not shown. A dielectric region 60 is shown with contact pattern 61 formed therein. Metal layer 70 is formed above the upper surface of dielectric region 60 and fills the contact pattern 61. The upper surface 11 of wafer 10 is generally non-planar before CMP processing.

FIG. 2b shows the result of CMP processing performed with equipment like that shown in FIG. 1. At the end of the CMP processing, the upper surface 11 of wafer 10 is generally planar. All that remains of metal layer 70 is a contact 71 formed in contact pattern 61. The technique illustrated in FIG. 2a and FIG. 2b is a well-known application of metal CMP processing to form a metal contact for connecting two conductive regions separated by an insulator. It will be appreciated that there are other possible applications of metal CMP to integrated circuit fabrication, for example metal plugs, metal damascene processes, etc.

The present invention provides a CMP slurry based on a passivation type chemistry that is particularly useful in CMP processing of aluminum and titanium features. In general, passivation is achieved by creation of a protective oxide on a metal surface. For example, in the case of aluminum, an $Al_2O_3$ passive oxide or a hydrous oxide may be typically formed. Significantly, it has been discovered that such oxides are not stable in aqueous solutions having a pH of less than about 4 or greater than about 9. As a result, CMP slurries of the prior art having pH values outside this range have not been effective in forming aluminum passivation layers that successfully protect aluminum surfaces from unwanted etching and dishing problems. The present invention provides CMP slurries buffered to have a pH of from about 4 to about 9, instead of the acidic pH of less than 4 or the highly basic pH of greater than 9 utilized by the prior art. Therefore, slurry embodiments of the present invention do not substantially etch or corrode aluminum or titanium surfaces in the absence of abrasive action, and little or no dishing occurs during the CMP process. The slurry embodiments of the present invention also are less chemically aggressive toward metal polishing tool components.

In the practice of the present invention, a CMP slurry typically comprises at least one oxidant. An oxidant may be a slurry diluent capable of forming a passive oxide film on a metal layer. An oxidant may also be a separate oxidizing agent. No separate oxidizing agent may be required when a slurry diluent, such as water or an aqueous solution, acts as an oxidant and is capable of passivating a metal. For example, in an aqueous CMP slurry, a passive oxide film may be formed on a layer of reactive metal having a negative standard reduction potential in the absence of a separate oxidizing agent. Examples of such reactive metals include, but are not limited to, those metals having very negative standard reduction potentials that are more negative than about −1.0 volts.

Aluminum and titanium are reactive metals that tend to be thermodynamically unstable in aqueous media. Both of these metals have standard reduction potentials that are more negative than about −1.0 volts and are readily passivated upon contact with most aqueous solutions. When exposed to an aqueous CMP slurry of the present invention, aluminum and titanium metals will typically evolve hydrogen until a protective oxide film is formed. Standard reduction potentials for aluminum, titanium and hydrogen are presented below:

| Element | Reduction Reaction | Standard Reduction Potential |
|---|---|---|
| Hydrogen: | $2H^+ + 2e^- \rightarrow H_2$ | 0 volts |
| Aluminum: | $Al^{+3} + 3e^- \rightarrow Al$ | −1.706 volts |
| Titanium: | $Ti^{+2} + 2e^- \rightarrow Ti$ | −1.63 volts |

Although a separate oxidizing agent is not required, a CMP slurry according to the present invention typically includes an added oxidant of suitable strength in order to accelerate the oxidation process of a metal during a CMP process, so that a passive oxide layer may be continuously reformed at a high rate as it is abraded away. This is true, even when a slurry contains a diluent that is an oxidant capable of forming a passive oxide film on a metal layer. Furthermore, a slurry may include a buffer to maintain a pH of from about 4 to about 9, a corrosion inhibitor (if desired), and a suitably dispersed abrasive. A typically used separate oxidizing agent is aqueous ammonium peroxydisulfate, $(NH_4)_2S_2O_8$, which is readily available in high purity grades. However, other suitable oxidizing agents known to those skilled in the art may also be used, for example alkali or metal peroxydisulfate salts, iodates, bromates, chlorates (such as potassium chlorate) or other oxidants which will not form precipitates at the proposed pH range may be utilized. In addition, co-oxidants may be added. But, co-oxidants have generally been found to be unnecessary. However, corrosion inhibitors such as benzotriazole, 6-tolylytriazole, and 1-(2, 3, dicarboxypropyl-) benzotriazole may have some beneficial effects and could also be added. In addition, certain low molecular weight glycols may be effective corrosion inhibitors as well.

In the practice of the present invention, suitable buffers may be prepared by combining a weak acid and its conjugate base. Preferred buffers that may be employed in the practice of this invention include acetate and phosphate buffers formed by adding a suitable amount of sodium hydroxide to acetic or phosphoric acid, respectively. It is also possible to prepare a suitable buffer using acetic acid and sodium acetate. Ammonium hydroxide or tetramethyl-, tetraethyl- or tetrabutyl- forms of ammonium hydroxide may be used to help eliminate positive mobile ion contamination. A suitable basic buffer having a pH of about 9 may be prepared by adding ammonium chloride to ammonium hydroxide. Buffers may be prepared in a number of ways, and other suitable buffers known to those skilled in the art, such as carbonate buffers derived from carbonic acid, may be used in the practice of the present invention. In the preparation of the slurry of one embodiment of the present invention, it is preferable to first dissolve ammonium peroxydisulfate in deionized water prior to combining the oxidant with the buffer solution due to the acid/base properties of the salt used.

In the practice of the present invention, a relatively hard abrasive is preferred due to the hardness of the protective oxide which is formed on the aluminum or aluminum based metal surface. Alumina, such as γ-alumina, or fumed alumina is preferred. However, other suitable abrasives such as, for example, magnesia or polymers may also be employed. In one embodiment of the present invention, an example mechanism by which an aqueous peroxydisulfate oxidant is believed to create a passive oxidation layer on aluminum is represented by the following equation:

$$2Al+3S_2O_8^{-2}+3H_2O \rightarrow Al_2O_3+6H^++6SO_4^{-2}$$

However, it is believed that firther reactions may also occur, such as:

$$Al_2O_3+3H_2O \rightarrow 2Al(OH)_3$$

In the practice of the present invention, the amount of oxidant and buffer used in a slurry composition will depend largely upon the CMP removal rate desired, the type of oxidant and buffer selected, the cost of the oxidant and buffer materials, and the cost of slurry disposal or reclamation. Minimal concentrations of both oxidant and buffer will, as a result, be set by the reasons listed above as well as the need to reduce the level of residual contamination on process wafers as well as in the fab itself. Typical slurry compositions contain ammonium peroxydisulfate oxidant present in a range of from about 1% to about 5% by weight, and have an acetate or phosphate buffer present in a concentration of from about 0.1M to about 1M.

Using the slurry compositions as described herein, solutions having a pH of from about 4 to about 9 may be prepared. A preferred pH range is from about 4 to about 6 and most preferred is a pH range of from about 4 to about 5. The pH ranges specified above ensure that a stable passive oxide film, such as aluminum oxide, is formed on the metal surface being polished. This stable oxide film passivates the metal and reduces the rate of metal dissolution or prevents metal etching completely, thus preventing dishing and allowing smooth surfaces to be formed during the CMP process. Due to the nature of the oxidants employed, the kinetics of the passivation oxidation are rapid. However, during the CMP process, the passivation oxide is removed by abrasion to allow metal removal. Thus, a slurry having a high removal rate and high selectivity in the absence of dishing is provided. In addition, these slurry pH ranges are less chemically aggressive toward metal polishing tool components than the slurry pH ranges of the prior art.

Figure 3:
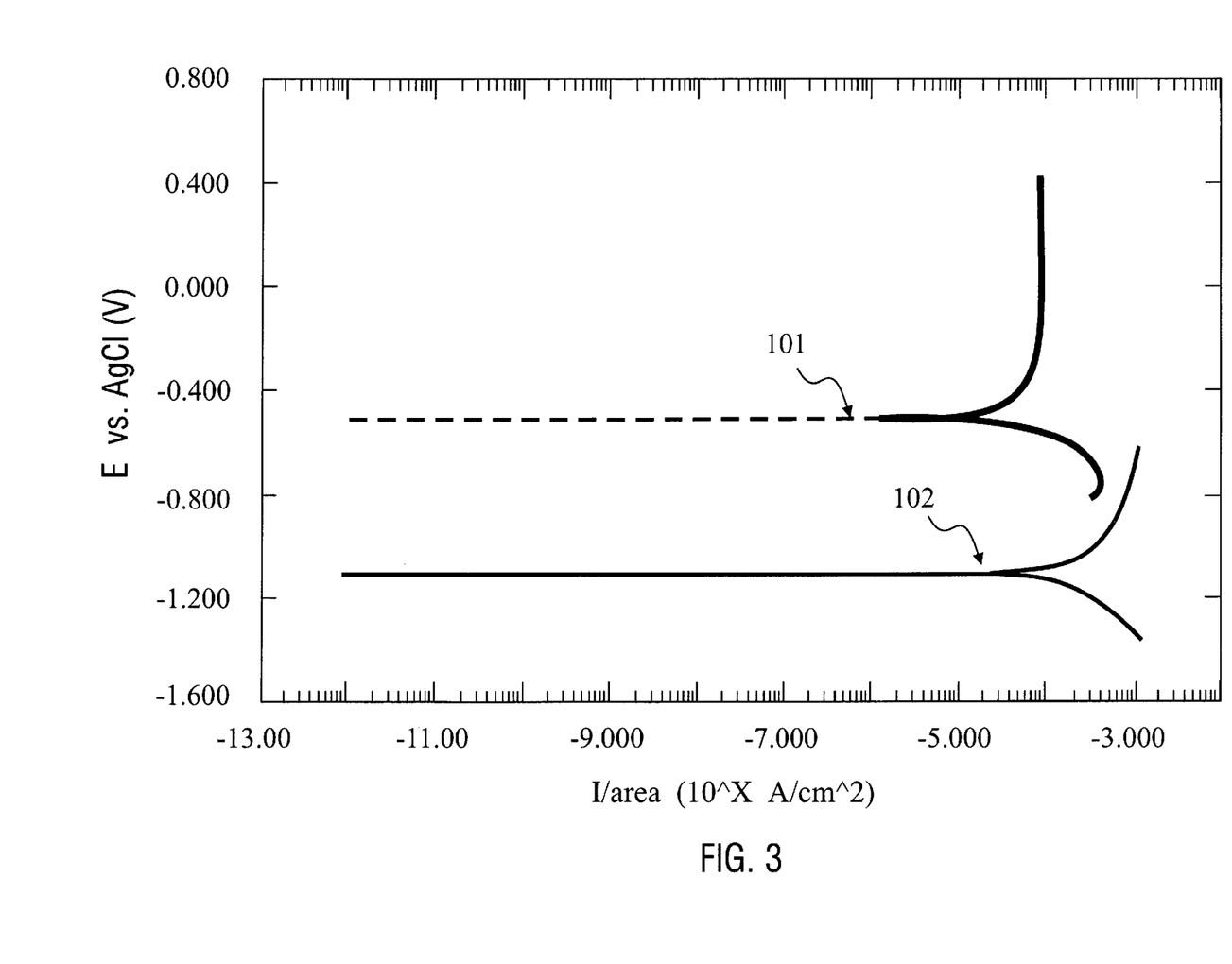
FIG. 3 shows potentiodynamic scans illustrating the beneficial characteristics of an acetate buffered slurry of the present invention when used on aluminum.
Figure 4:
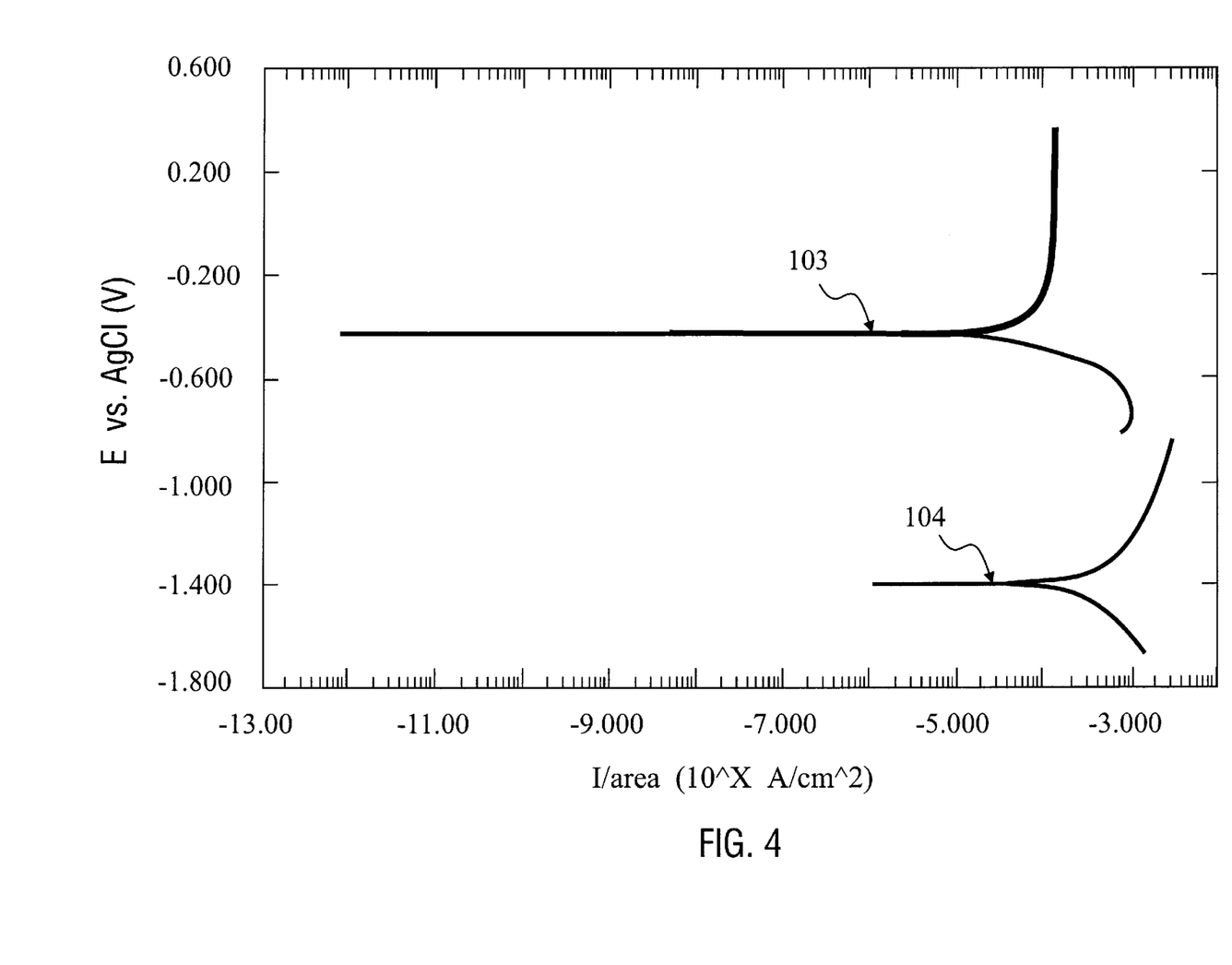
FIG. 4 shows potentiodynamic scans illustrating the beneficial characteristics of a phosphate buffered slurry of the present invention when used on aluminum.

FIG. 3 and FIG. 4 show potential dynamic scans with and without abrasion for pure aluminum in aqueous ammonium peroxydisulfate solutions buffered with acetate and phosphate buffers, respectively. In FIG. 3, a 5% by weight peroxydisulfate slurry buffered to have a pH of 4.13 was employed. The CMP slurry used in FIG. 4 was a 5% by weight peroxydisulfate slurry buffered to have a pH of 4. A suitable abrasive/pad combination may be the "RODEL IC 1000" pad or other rough polishing pad used with alumina abrasive.

The utilization of potentiodynamic scans such as those provided in FIG. 3 and FIG. 4 provides an electrochemical method for predicting the polishing mechanism of a slurry. As shown in FIG. 3, each potentiodynamic scan 101 and 102 includes an anodic and cathodic curve. The scans can be characterized by identifying and comparing the relative corrosion current and the corrosion potential for each scan. Corrosion current may be approximated by identifying the point where the anodic and cathodic currents are equal in magnitude (as shown in FIG. 3, the approximate logarithm of the corrosion current is the point at which the currents first intersect, for example about −5.0 for scan 101). However, a more accurate determination of corrosion current may be made by considering all data on both sides of an intersection point and performing a nonlinear least squares fit to the Stem-Geary equation as described in Stern and Geary, J. Electrochem. Soc., 104:56, 1957, which is hereby incorporated by reference. Corrosion potential may be identified as the potential at the intersection point of the curves that form a scan. It has been found that the corrosion current correlates to the CMP removal rate. More particularly, as the value of the corrosion current decreases, the CMP removal rate generally decreases. Furthermore, the corrosion potential indicates the amount and completeness of coverage of passivation film formed on the aluminum (for example, a thin, densely packed passivation layer tends to change the corrosion potential more than a thick, porous layer). A large offset between the corrosion currents and potentials for the with polish scan and the without polish scan is desirable. Further, in the without polish case, it is desirable to have minimal corrosion (indicting that a stable passivation layer has been formed and no substantial metal dissolution is occurring).

In FIG. 3, scan 101 corresponds to use of an acetate buffered ammonium peroxydisulfate solution, without polishing. Scan 102 corresponds to use of an acetate buffered ammonium peroxydisulfate solution, with polishing. In FIG. 4, scan 103 corresponds to the use of a phosphate buffered ammonium peroxydisulfate solution, without polishing. Scan 104 corresponds to use of a phosphate buffered ammonium peroxydisulfate solution, with polishing. The potentiodynamic scans in both FIG. 3 and FIG. 4 reveal that slurry formulations of the present invention allow a stable aluminum passivation layer to form and achieve a passivation type of chemistry. This is indicated by the difference between the corrosion currents and potentials of the aluminum electrode when undergoing abrasion (with polishing) and when not undergoing abrasion (without polishing). For example, it may be visually seen from FIG. 3 that with polishing the logarithm of the corrosion current is higher (scan 102, approximately −4.5) than without polishing (scan 101, approximately −5.0). Similarly, it may be visually seen from FIG. 4 that with polishing the logarithm of the corrosion current is higher (scan 104, approximately −4.3) than without polishing (scan 103, approximately −5.0). Thus, the ammonium peroxydisulfate solution provides a CMP removal rate which is higher during polish than without polish, indicating no substantial dissolution occurring in the without polish state. This shows that the chemistry of the present invention is primarily passivation based, rather than etching based, which is desirable for a CMP process.

As for corrosion potential, it may be seen in FIG. 3 that the potential for the acetate buffered ammonium peroxydisulfate solution with polishing (scan 102, approximately −1.1) is lower than the corrosion potential for the same solution without polishing (scan 101, approximately −0.5). Likewise, in FIG. 4 the corrosion potential for the phosphate buffered solution with polishing (scan 104, approximately −1.4) is also lower than the ammonium peroxydisulfate solution without polishing (scan 103, approximately −0.4). In both cases, the less negative corrosion potential for the ammonium peroxydisulfate solution without polishing indicates less exposure of the bare metal surface. This indicates that the aluminum is protected by a stable passive film. In summary, the difference between the potentiodynamic curves indicate that buffered ammonium peroxydisulfate formulations of the present invention result in a slurry solution having desirable passivation characteristics.

Figure 5:
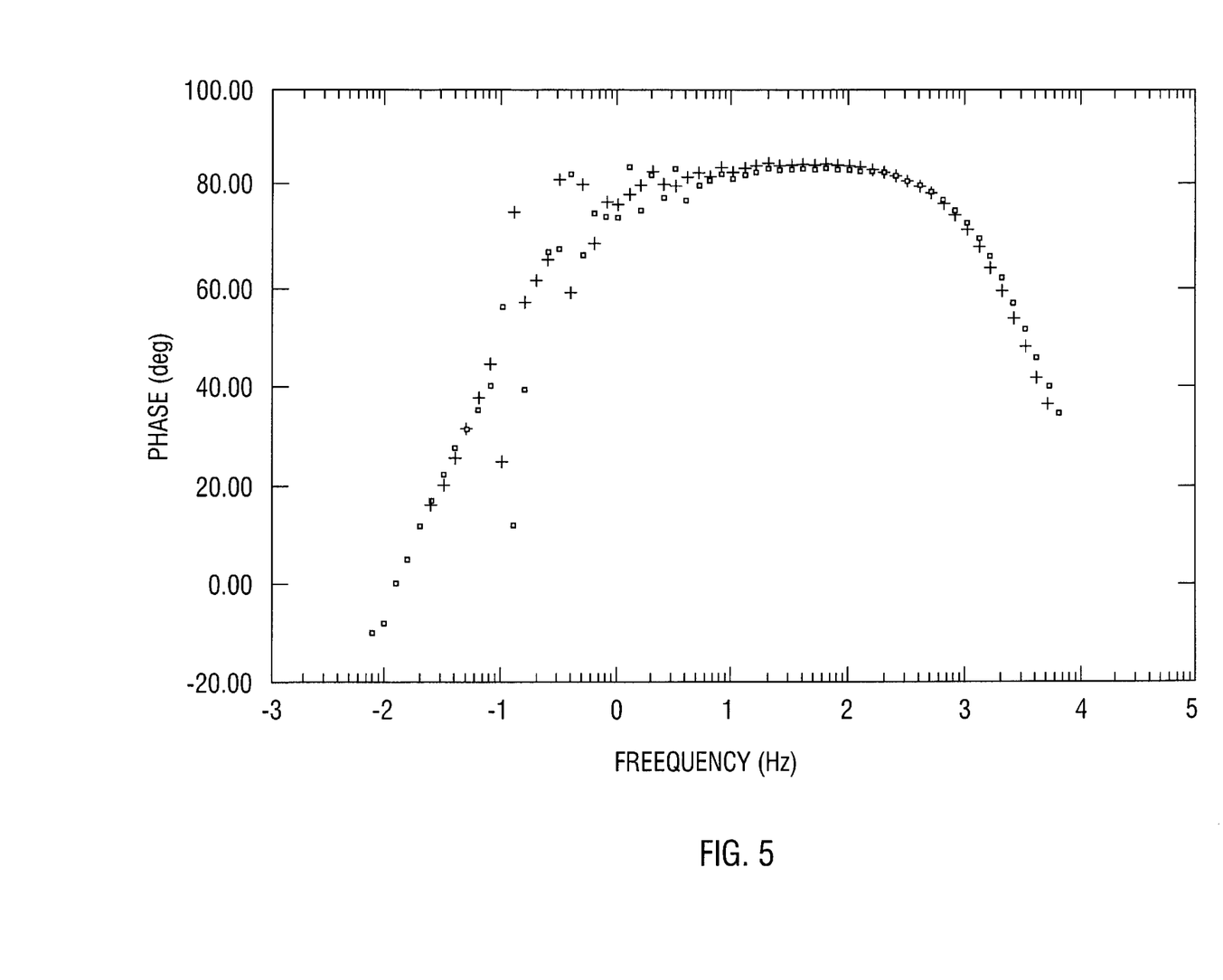
FIG. 5 shows time resolved impedance measurements illustrating the beneficial characteristics of a phosphate buffered slurry of the present invention when used on aluminum.

FIG. 5 shows time resolved impedance measurements over an approximate frequency range of about 100 KHz to about 10 MHz for aluminum in a phosphate buffered ammonium peroxydisulfate solution having a pH of about 4.13. These time resolved impedance measurements are nearly identical, indicating the near or total absence of chemical processes, such as etching. These measurements reveal that there is little or no corrosion taking place in the absence of abrasion and that the 5% weight oxidant solution is not an etchant.

Figure 6:
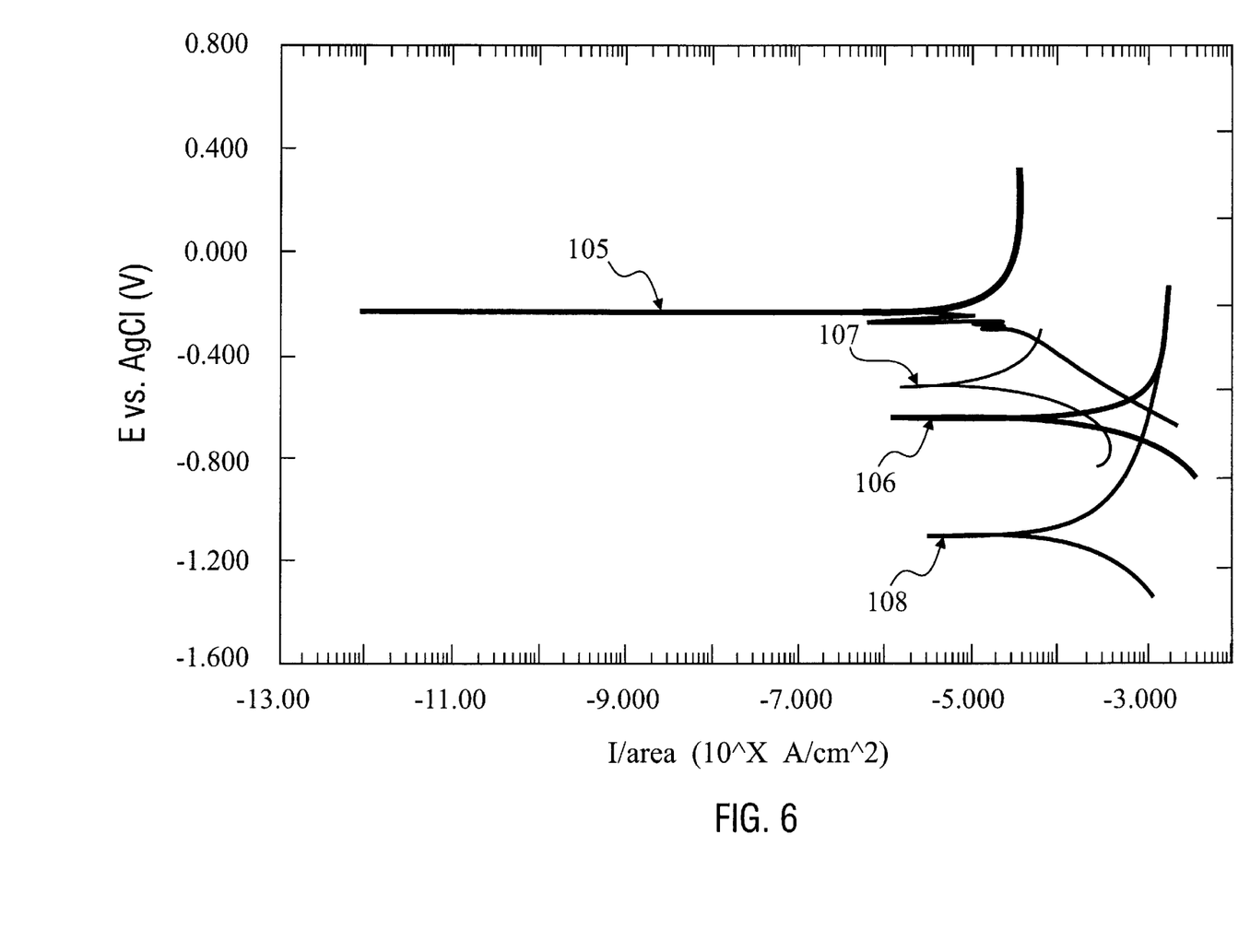
FIG. 6 shows potentiodynamic scans illustrating the beneficial characteristics of a phosphate buffered slurry of the present invention when used on aluminum and titanium.

FIG. 6 shows that desirable passivation characteristics similar to those achieved with aluminum may also be achieved with titanium using a phosphate buffered aqueous ammonium peroxydisulfate solution having a pH of about 4.13. For example, it may be visually seen that the difference between the logarithm of corrosion current for titanium with polishing (scan 106, approximately −4.4) and without polishing (scan 105, approximately −5.7) is very similar to the difference between the logarithm of corrosion current for aluminum with polishing (scan 108, approximately −4.5) and without polishing (scan 107, approximately −5.0). It may also be seen in FIG. 6 that the difference between corrosion potential for titanium with polishing (scan 106, approximately −0.65) and without polishing (scan 105, approximately −0.2) is very similar to the difference between corrosion potential for aluminum with polishing (scan 108, approximately −1.1) and without polishing (scan 107, approximately −0.5). In both cases, higher corrosion current with polishing indicates no substantial dissolution occurring in the without polish state, and higher corrosion potential without polishing indicates less exposure of the bare metal surface. This indicates that both titanium and aluminum are protected by a stable passive film. This is significant because titanium is often used as an adhesion or barrier layer for an aluminum-based film. Removal of such titanium adhesion layers during an aluminum CMP process is important, and may be accomplished using the ammonium peroxydisulfate slurry formulation of the disclosed method with nearly a 1:1 selectivity.

Figure 7:
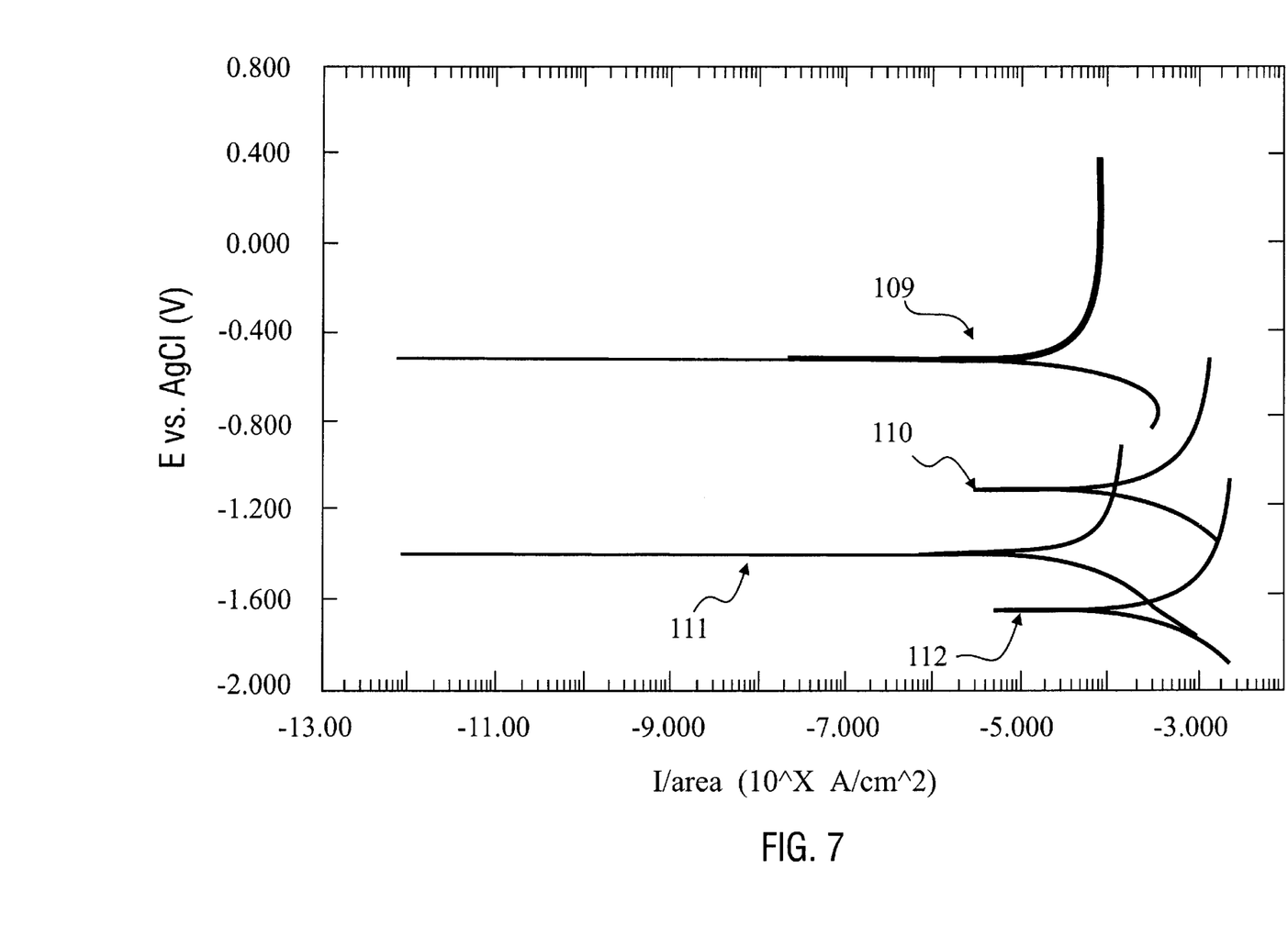
FIG. 7 shows potentiodynamic scans illustrating the beneficial characteristics of an aqueous ammonium chloride/ammonium hydroxide buffered slurry of the present invention when used on aluminum with and without an ammonium peroxydisulfate oxidant.

FIG. 7 illustrates that good passivation characteristics may be obtained using aqueous CMP slurries of the present invention without the use of a separate oxidizing agent. In FIG. 7, potentiodynamic scans with and without abrasion for aluminum in an aqueous, phosphate buffered 5% ammonium peroxydisulfate solution having a pH of about 4 (scans 110 and 109, respectively) are presented. Also presented are potentiodynarnic scans with and without abrasion for aluminum in an aqueous ammonium chloride/ammonium hydroxide buffered solution having a pH of about 8.93 and no separate oxidizing agent (scans 112 and 111, respectively). In FIG. 7, it may be visually seen that the difference between the logarithm of corrosion current for aluminum with polishing (scan 112, approximately −4.4) and without polishing (scan 111, approximately −5.5) in the absence of a separate oxidizing agent is very similar to the difference between the logarithm of corrosion current for aluminum with polishing (scan 110, approximately −4.5) and without polishing (scan 109, approximately −5.3) in the presence of ammonium peroxydisulfate oxidant. It may also be seen in FIG. 7 that the difference between corrosion potential for aluminum with polishing (scan 112, approximately −1.65) and without polishing (scan 111, approximately −1.4) in the absence of a separate oxidizing agent is similar, though roughly half the difference between corrosion potential for aluminum with polishing (scan 110, approximately −1.1) and without polishing (scan 109, approximately −0.5) in the presence of ammonium peroxydisulfate oxidant.

In the scans presented in FIG. 7, higher corrosion current with polishing indicates a higher CMP removal rate with polishing and no substantial dissolution occurring in the absence of polishing, both in the presence and absence of a separate oxidizing agent. Higher corrosion potentials without polishing indicate that aluminum is protected by a stable passive film both in the presence and absence of a separate oxidizing agent. This was confirmed for the 8.93 pH solution without separate oxidant, where consecutive impedance measurements indicated that the aluminum was stable and no significant corrosion processes were occurring. However, the fact that values of corrosion potential are more negative when no separate ammonium peroxydisulfate oxidizing agent is present suggests that there may be less oxide coverage when a separate oxidizing agent is not used.

Figure 8:
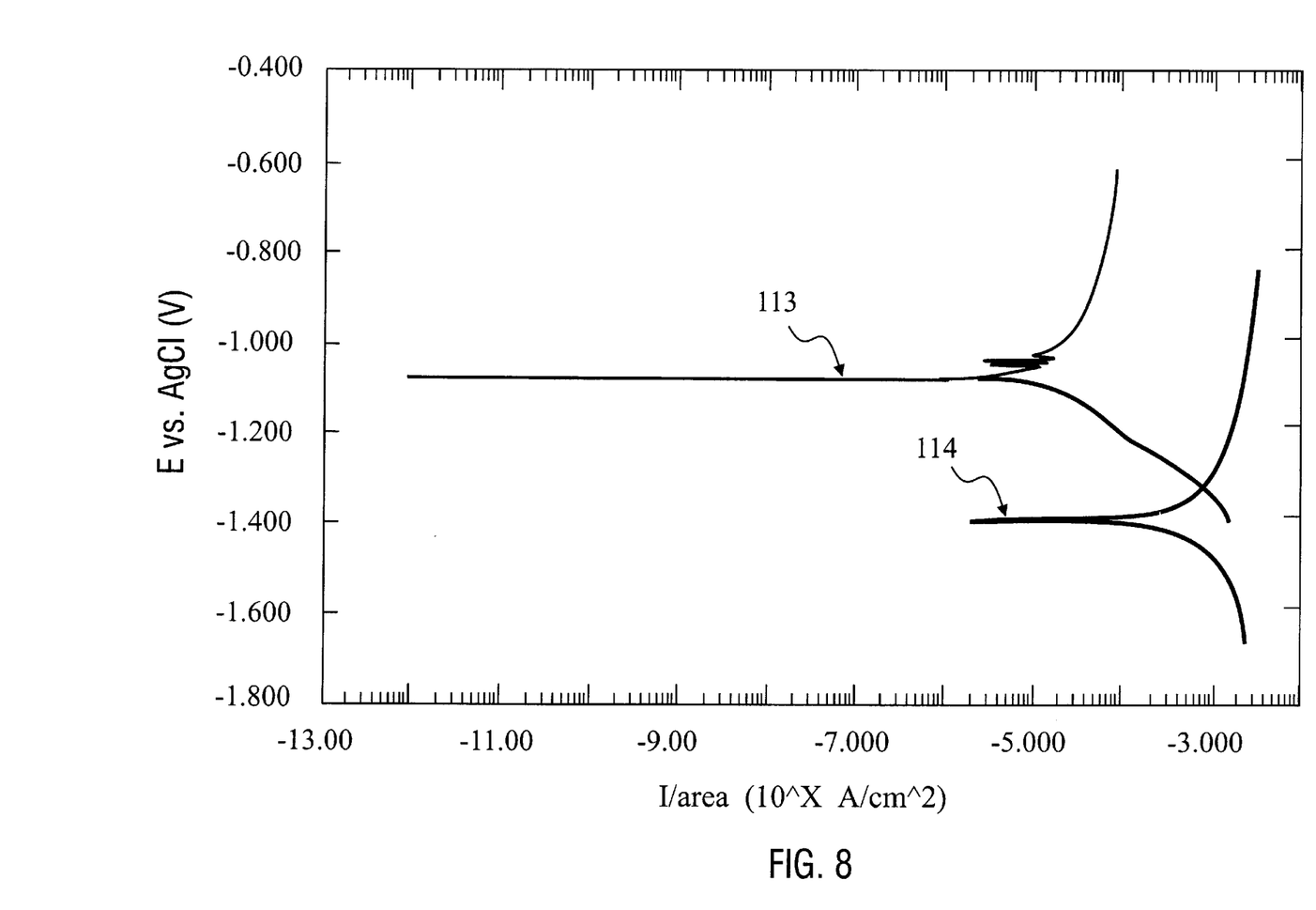
FIG. 8 shows potentiodynamic scans illustrating the beneficial characteristics of an aqueous acetate buffered slurry of the present invention when used on aluminum without a separate oxidizing agent.

Similarly, potentiodynamic scans presented in FIG. 8 illustrate good passivation characteristics for aluminum in an aqueous acetate buffered slurry having a pH of about 4 and no separate oxidizing agent. In FIG. 8, the logarithm of the corrosion current with polishing is higher (scan 114, approximately −4.5) than without polishing (scan 113, approximately −6.0). Likewise, the corrosion potential with polishing (scan 114, approximately −1.4) is lower than the potential without polishing (scan 113, approximately −1.1).

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A solution for use in chemical mechanical polishing of an aluminum based metal layer on a semiconductor substrate, said solution comprising:

a buffer capable of maintaining the pH of the solution between about 4 and about 9; and an oxidant capable of causing a passive oxide film to form on the aluminum based metal, said oxidant comprising a separate oxidizing agent in said solution;

wherein said passive oxide film allows smooth surfaces to be formed during the chemical mechanical polishing process, and wherein said oxidizing agent comprises at least one of an alkali or metal peroxydisulfate salt, an iodate, a bromate, a chlorate or a mixture thereof.

2. The solution of claim 1, wherein the pH of the solution is between about 4 and about 6.

3. The solution of claim 1, wherein the separate oxidizing agent comprises ammonium peroxydisulfate.

4. The solution of claim 3, wherein a concentration of ammonium peroxydisulfate in said solution is from about 1% to about 5% by weight.

5. The solution of claim 1, wherein the buffer comprises at least one of acetic acid, phosphoric acid, carbonic acid, ammonium chloride, or a mixture thereof mixed with at least one of sodium hydroxide, sodium acetate, ammonium hydroxide, tetramethyl-anmmonium hydroxide, tetraethyl-ammonium hydroxide, tetrabutyl-ammonium hydroxide, or a mixture thereof.

6. The solution of claim 5, wherein the buffer is present in the solution in a concentration of from about 0.1M to about 1M.

7. The solution of claim 6, wherein the oxidant comprises a separate oxidizing agent, said separate oxidizing agent comprising from about 1% to about 5% by weight of ammonium peroxydisulfate oxidant.

8. A solution for use in chemical mechanical polishing of an aluminum based metal layer on a semiconductor substrate, said solution comprising an ammonium peroxydisulfate oxidant and a buffer, wherein said solution has a pH of between about 4 and about 9.

9. The solution of claim 8, wherein the solution comprises an aqueous diluent.

10. The solution of claim 8, wherein the buffer comprises at least one of acetic acid, phosphoric acid, carbonic acid, ammonium chloride, or a mixture thereof mixed with at least one of sodium hydroxide, sodium acetate, ammonium hydroxide, tetramethyl-ammonium hydroxide, tetraethyl-ammonium hydroxide, tetrabutyl-ammonium hydroxide, or a mixture thereof.

11. The solution of claim 8, wherein a concentration of ammonium peroxydisulfate in said solution is from about 1% to about 5% by weight.

12. The solution of claim 8, wherein the pH of the solution is between about 4 and about 6.

13. The slurry of claim 10, wherein the buffer is present in the slurry in a concentration of from about 0.1M to about 1M.

14. A solution for use in chemical mechanical polishing of an aluminum based metal layer on a semiconductor substrate, wherein said solution has a pH of between about 4 and about 9 and comprises a separate oxidizing agent capable of causing a passive oxide film to form on the metal based layer, and wherein said passive oxide film allows smooth surfaces to be formed during the chemical mechanical polishing process, and wherein said oxidizing agent comprises at least one of an alkali or metal peroxydisulfate salt, an iodate, a bromate, a chlorate or a mixture thereof.

15. The solution of claim 14, wherein the separate oxidizing agent comprises ammonium peroxydisulfate.

16. A solution for use in chemical mechanical polishing of a metal layer on a semiconductor substrate, wherein said metal has a standard reduction potential that is more negative than about −1.0 volts, said solution comprising:

a buffer capable of maintaining the pH of the solution between about 4 and about 9; and an oxidant capable of causing a passive oxide film to form on said metal at a pH of between about 4 and about 9, said oxidant comprising a separate oxidizing agent in said solution;

wherein said passive oxide film allows smooth surfaces to be formed during the chemical mechanical polishing process, and wherein said oxidizing agent comprises at least one of an alkali or metal peroxydisulfate salt, an iodate, a bromate, a chlorate or a mixture thereof.

17. The solution of claim 16, wherein the metal layer is comprised of at least one of aluminum, titanium, or a mixture thereof.

18. The solution of claim 17, wherein the metal layer is comprised of aluminum.

19. The solution of claim 17, wherein the metal layer is comprised of titanium.

20. The solution of claim 17, wherein the pH of the slurry is between about 4 and about 6.

21. The solution of claim 16, wherein the separate oxidizing agent comprises ammonium peroxydisulfate.

22. The solution of claim 21, wherein a concentration of ammonium peroxydisulfate in said solution is from about 1% to about 5% by weight.

23. The solution of claim 17, wherein the buffer comprises at least one of acetic acid, phosphoric acid, carbonic acid, ammonium chloride, or a mixture thereof mixed with at least one of sodium hydroxide, sodium acetate, ammonium hydroxide, tetramethyl-ammonium hydroxide, tetraethyl-ammonium hydroxide, tetrabutyl-ammonium hydroxide, or a mixture thereof.

24. The solution of claim 23, wherein the buffer is present in a concentration of from about 0.1M to about 1M.

25. The solution of claim 24, wherein the oxidant comprises a separate ammonium peroxydisulfate oxidizing agent, and wherein a concentration of said ammonium peroxydisulfate in said slurry is from about 1% to about 5% by weight.

* * * * *